J. W. CRUIKSHANK.
GLASS POLISHING APPARATUS.
APPLICATION FILED DEC. 23, 1918.
1,318,848.
Patented Oct. 14, 1919.
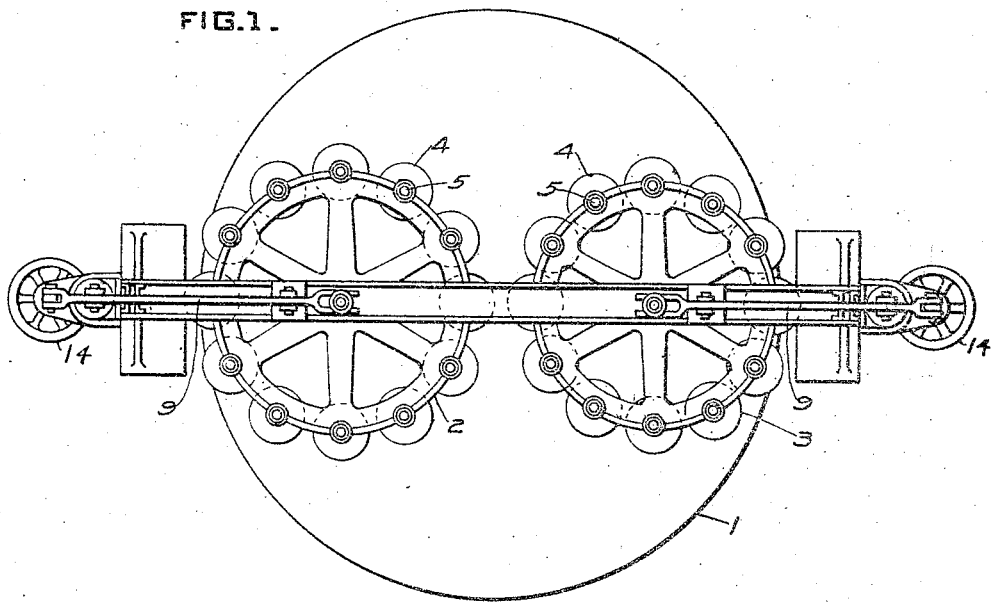
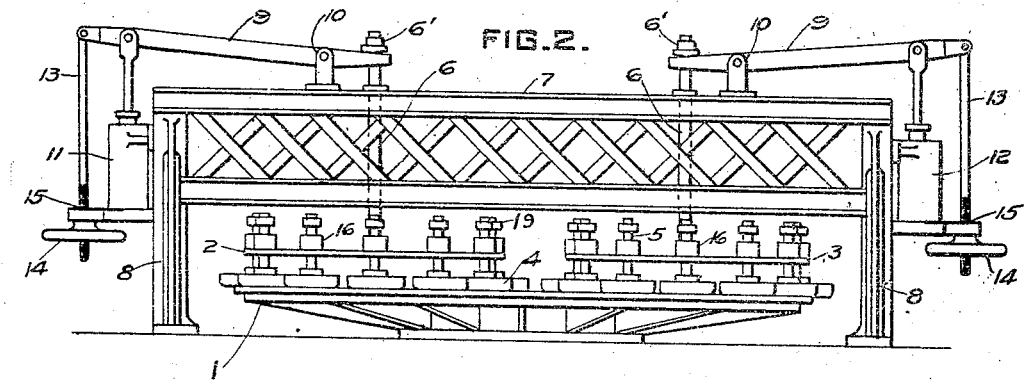
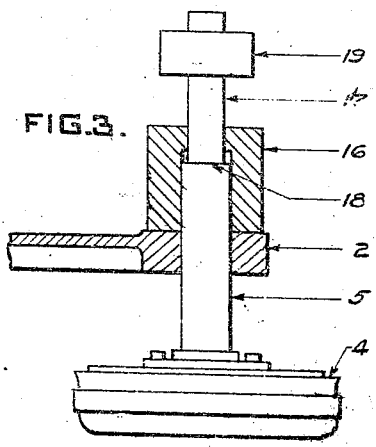
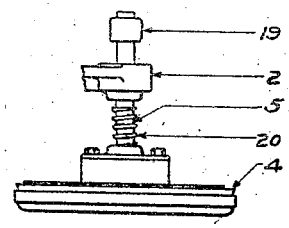
WITNESSES
J. Herbert Bradley
INVENTOR
James W. Cruikshank

UNITED STATES PATENT OFFICE.

JAMES W. CRUIKSHANK, OF PITTSBURGH, PENNSYLVANIA, ASSIGNOR TO J. W. CRUIKSHANK ENGINEERING COMPANY, OF PITTSBURGH, PENNSYLVANIA.

GLASS-POLISHING APPARATUS.

1,318,848.  Specification of Letters Patent.  Patented Oct. 14, 1919.

Application filed December 23, 1918. Serial No. 267,972.

*To all whom it may concern:*

Be it known that I, JAMES W. CRUIK-SHANK, citizen of the United States, resident of Pittsburgh, county of Allegheny, and State of Pennsylvania, have invented a new and useful Improvement for Glass-Polishing Apparatus, of which the following is a full, clear, and exact description.

The invention relates to the principle of varying the amount of pressure of the polishing blocks which rest on the glass surface on the grinding table, during the operation of polishing, which pressure so far has been constant and depending on the weight of the block. In the process of the manufacture of plate glass the polishing operation follows that of grinding the glass laid on a revolving circular table. After the grinding has been done with sand and the glass reduced to a fine surface by means of emery, the table is taken to the polishing machine where it is polished by means of circular runners, carrying blocks covered with felt, using rouge as a polishing medium. During the first part of the operation water is thrown on the table so as to moisten the blocks and also to remove any foreign matter from the surface of the glass after which rouge mixed with water is applied gradually until the polishing operation commences when considerable heat is developed due to the friction of the blocks on the glass surface. During the first part of the operation when there is more water than rouge and the blocks have no tendency to take hold of the glass and there is little friction, it is advisable to employ a much heavier pressure of the blocks on the glass than can be afterward used. The more weight that is applied at this first stage the sooner the actual polishing action will commence. As the process proceeds the pull of the felt on the glass surface becomes very heavy, so much so that if the weight exceeds a certain unit per block or per sq. ft., the glass, which is laid in plaster of Paris, would be pulled off the table.

In order to produce these conditions and reduce the time of polishing I have devised an apparatus by which additional weight can be readily added to the polisher block at the beginning of the operation, which when removed leaves the weight of the block normal as has been determined, through practice, for obtaining the best results in polishing.

Referring to the drawing Figure 1 is a plan view of a glass polishing machine, Fig. 2 is a front elevation of the same, Fig. 3 is a polishing block in detail, Fig. 4 a modification of the same. The numeral 1 represents the usual grinding table or platform on which the glass is laid, having runners 2 and 3 having blocks 4 which rest on the surface of the glass. These blocks have vertical spindles 5 which pass through the holes in the rim of the runners 2 and 3 by which they are spaced at a constant distance apart and keep their relative position during the rotation of the table 1 and the runners 2 and 3. The runners are mounted on shafts 6 in bearings in the bridge girder 7 which is supported on either side by standards 8. Means are provided for raising the shafts 6 carrying the runners 2 and 3 by collars 6' supported by levers 9 mounted on fulcrums 10 by admitting water respectively to the cylinders 11 or 12. I also provide screws 13 attached to extensions to the levers 9 with hand wheels 14 and brackets 15 so that the runners 2 and 3 can be raised independently by the action of these hand wheels and screws.

Counterweights 16 are provided and shown in Fig. 3 as resting on the runner 2 or 3 as the case may be. Spindle 5 is reduced to a smaller diameter at its upper part 17 where it passes through the counterweight 16, there being a shoulder 18 between the two diameters of the spindle. In the upper part 17 a fixed collar 19 is keyed or otherwise fastened.

In Fig. 4 a spring 20 is placed between the block 4 and the runner 2, the spindle 5 passing through the runner 2 of one diameter throughout, having a collar 19 fastened to its top.

The operation is as follows:—The table covered with glass is brought in to the machine and placed on the running gear, the runners 2 and 3 being raised are then lowered by opening the hydraulic cylinders 12 until the blocks 4 are in contact with the glass surface. The lowering movement of the runners is stopped by the hand wheels 14 on the screws 13 coming in contact with the brackets 15, so that the counterweights 16 rest on the edge of the runners as shown in Fig. 3. The spider is then set in motion causing the table to revolve, with runners moving in the same direction as the table, the blocks carried by them having a slipping action at the outside edge of the table which drives them faster than the table at its center so that throughout their travel over the table they have a polishing action. As soon as the table starts to revolve the runners are still further lowered by means of the hand wheels and screws so that the support is taken from the counterweights 16 and they are allowed to rest on the shoulders 18 of the spindles 5 thus adding their weight to that of the blocks and spindles. The runners remain suspended on the collars 6' otherwise free of the blocks excepting as acting as guides for them to keep them in their relative positions. During the first part of the operation as before described, there is little friction due to the excess of water supplied to the table, but as the water begins to dry up and rouge carried by water is supplied to the glass surface considerable heat is produced and the blocks will begin to pull so that the pressure on them must be reduced. In order to do this the operator raises the runners by means of the hand wheel 14 operating on the screws 13, the counterweights 16 are carried on the runners and the extra weight is relieved from the polishing blocks.

At the end of the operation the runners are raised until the top of the counterweight 16 comes in contact with the collars 19 and the blocks are removed from the surface of the glass so that the table can be withdrawn.

Fig. 4 shows an alternate arrangement in which springs 5 are interposed between the runners and the blocks so that when the runners are lowered beyond a certain point their weight will rest on the blocks through the medium of the springs thus increasing the pressure on the blocks to a maximum of the total weight of the runner. In this arrangement the springs have the function of distributing the weight of the runners evenly between the blocks as otherwise the weight of the runner would be carried unevenly which would cause breakage of the glass.

It is understood that I do not limit myself to the exact construction as shown and may make changes in order to carry out the object of the invention as set forth.

I claim:

1. In a machine for polishing plane surfaces, having a rotatable platform with a plane horizontal glass supporting surface and a plurality of polishing blocks, means for increasing simultaneously the pressure of the individual blocks on the glass surface during a continuous polishing operation of the machine.

2. In a machine for polishing horizontal plane surfaces, having a rotatable platform with a plane horizontal glass supporting surface and a plurality of polishing blocks, means for increasing or decreasing simultaneously the weight of the individual blocks on the glass surface during a continuous polishing operation of the machine.

3. A machine for polishing glass sheets comprising a rotatable platform having a plane horizontal glass supporting surface, horizontally rotatable runners mounted on vertical shafts carried by a bridge over said platform, blocks having horizontal polishing surfaces swivelly mounted and suspended on the runners, means to lower the runners with the polishing blocks into contact with the glass surface, means for increasing the weight on the individual polishing blocks by further lowering the runners during a continuous polishing operation of the machine.

4. A machine for polishing glass sheets comprising a rotatable platform having a plane horizontal glass supporting surface, horizontally rotatable runners mounted on vertical shafts carried by a bridge over said platform, blocks having horizontal polishing surfaces mounted on the runners, means for raising and lowering the runners with the blocks, means for varying the pressure on the individual polishing blocks on the glass surface during a continuous polishing operation of the machine.

5. A plurality of polishing blocks swivelly mounted on vertical spindles, passing through bearings of a horizontally rotating frame, weights slidably mounted on the spindles, means for carrying the weights either on the polisher blocks or on the frame according to the position of the frame.

6. A plurality of polishing blocks swivelly mounted on vertical spindles passing through bearings of a horizontal rotating frame with sections of a reduced diameter forming shoulders above the bearings and having collars mounted at their tops, weights slidably mounted between the shoulders and the collars, means for raising and lowering the frame so that the weights may be carried either on the frame or may rest on the shoulders of the spindles.

JAMES W. CRUIKSHANK.